United States Patent [19]

Samoilov et al.

[11] 3,878,144

[45] Apr. 15, 1975

[54] METHOD FOR PREPARING CELLULOSE GRAFT COPOLYMERS UTILIZING TERVALENT IRON INITIATOR

[76] Inventors: Vladimir Ivanovich Samoilov, ulitsa Pervomaiskaya, 17-A, kv. 31, Mytischi, Moskovskoi oblasti; Rem Markovich Livshits, Samarkandsky bulvar, 13, Korpus 4, kv. 40, Moscow; Boris Pavlovich Morin, Kooperativnaya ulitsa, 4, kv. 22, Krasnogorsk; Zakhar Alexandrovich Rogovin, Donskaya ulitsa, 24, kv. 68, Moscow, all of U.S.S.R.

[22] Filed: May 21, 1974

[21] Appl. No.: 472,202

[52] U.S. Cl........ 260/17.4 GC; 8/116 R; 8/DIG. 18
[51] Int. Cl............................................. C08g 45/18
[58] Field of Search ............................ 260/17.4 GC

[56] References Cited
UNITED STATES PATENTS 3,008,920  11/1961  Urchick...................... 260/17.4 GC
3,194,727  7/1965   Adams et al......................... 162/168
3,330,787  7/1967   Faessinger ......................... 260/17.4
3,821,137  6/1974   Lishevskaya et al............... 260/17.4

FOREIGN PATENTS OR APPLICATIONS
886,552  1/1962  United Kingdom................ 260/17.4

OTHER PUBLICATIONS

Chem. Absts., vol. 75: 99322q – "Synthesis–graft-copolymer . ... Cellulose Xanthate/Vanadium," Samoilov et al.

*Primary Examiner*—Melvin Goldstein
*Assistant Examiner*—Edward Woodbury

[57] ABSTRACT

Cellulose derivatives, containing dithiocarboxylic or aldehyde groups are copolymerized with at least one vinyl monomer in an aqueous medium at pH from 1 to 4, preferably at pH from 1.4 to 1.5, the reaction of copolymerization being initiated by oxidizing dithiocarboxylic or aldehyde groups of cellulose with water-soluble salts of tervalent iron, preferably with $Fe_2(SO_4)_3$.

4 Claims, No Drawings

METHOD FOR PREPARING CELLULOSE GRAFT COPOLYMERS UTILIZING TERVALENT IRON INITIATOR

This invention relates to a method for preparing modified cellulose, and more particularly to a method for preparing copolymers of cellulose.

Synthesis of copolymers of cellulose substantially modifies the complex of the properties inherent in starting cellulose materials. For example, viscose fibre modified by polyacrylonitrile (PAN) grafting has increased resistance to attrition, light and heat stability, and increased resilience characteristic of wool fibre. Graft copolymers of cellulose and PAN are also more stable against the action of microorganisms that the starting cellulose. Graft copolymers of cellulose and polymethacrylic acid or polymethylvinylpyridine possess also ion-exchange power.

It is known that graft copolymers of cellulose can be synthesized by initiating the reaction of polymerization by oxidationreduction systems, in which the polymer plays the role of a reducing agent, while the oxidants are salts of metals having variable valency, or some other compounds. Graft copolymerization is in this case initiated by oxidation of cellulose or of its derivatives containing groups possessing reducing properties with the formation of a macro-radical of cellulose which gives the start to growth of the grafted chain. Salts of $Ce^{4+}$, $Co^{3+}$, $Mn^{3+}$, $V^{5+}$, $NaClO_2$ and $NaIO_4$ can be used as oxidants. Practical use of the redox systems, comprising the above compounds as oxidants for the synthesis of graft copolymers of cellulose is however significantly limited due to the side reaction of homopolymerization of the monomer and also due to the high cost of the above named oxidizing agents.

Known is a method for preparing graft copolymers of cellulose with various vinyl monomers involving utilization of an oxidation-reduction system in which the oxidant is a derivative of cellulose, cellulose xanthate, containing dithiocarboxyl groups possessing high reducing power. Peroxides used in this method are for example hydrogen peroxide. The oxidation-reduction of graft copolymerization of cellulose is in this case initiated as a result of oxidation of dithiocarboxyl groups by hydrogen peroxide (Diagram 1).

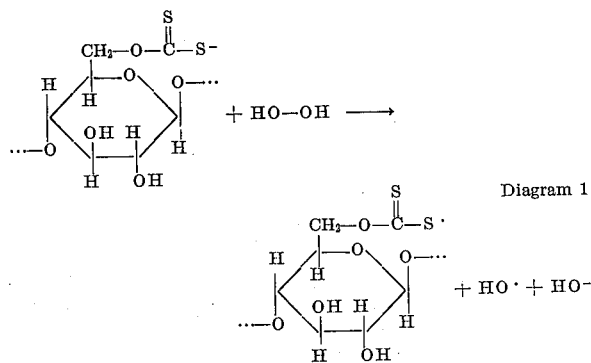

Diagram 1

Cellulose xanthate is graft copolymerized in the presence of $H_2O_2$ in an acid medium at pH from 1 to 7 or in emulsions of monomers at temperatures from 20° to 60°C for six and more hours. To eliminate the side reaction of formation of homopolymer in solution due to thermal decomposition of hydrogen peroxide, it is recommendable to carry out the synthesis of cellulose copolymers at lower temperatures (20°- 30°C), which, however, decreases the rate of the reaction and thus hinders the application of this method for synthesis of graft copolymers in a continuous process. Moreover, a disadvantage of the known method is the formation of homopolymer in the cellulose material (fibre, film, etc.) due to initiation of homopolymerization by low-molecular OH radicals (according to Diagram 2) which appear during the initiation of graft copolymerization according to Diagram 1.

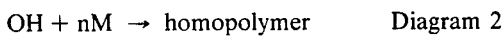

where M is the vinyl monomer and $n$ is the quantity of vinyl monomer molecules.

This involves an increased consumption of the graft monomer for the side reaction, while the formed homopolymer, not linked by the chemical bond with cellulose, deteriorates the properties of the modified cellulose material. Similar disadvantages are also inherent in the other oxidation — reduction systems used for synthesis of graft polymers of cellulose, in which the reducing polymers are derivatives of cellulose containing monothiocarboxylic

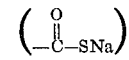

or sulfhydryl (—SH) groups, and the oxidizing agent are various peroxides, for examples, hydrogen peroxide, benzoyl peroxide, lauryl peroxide, etc.

The object of the invention is to provide a method for preparing graft copolymers of cellulose with vinyl monomers which would be suitable for carrying out graft copolymerization at high rate without formation of homopolymer in the cellulose material and in solution during practically unlimited length of time of the monomer contact with the oxidation-reduction system.

The object has been attained in the method for preparing copolymers of cellulose consisting in that cellulose derivatives containing dithiocarboxylic or aldehyde groups are copolymerized with at least one of the vinyl monomers in an aqueous medium at pH from 1 to 4, the reaction of copolymerization being initiated by oxidizing the dithiocarboxylic or aldehyde groups of cellulose by water-soluble ferric salts.

It has been established that oxidation of cellulose derivatives containing dithiocarboxylic or aldehyde groups with ferric salts proceeds according to the free-radical pattern of the reaction as a result of which it is possible to initiate graft copolymerization of cellulose with various vinyl monomers.

Oxidation of cellulose derivative by salts of ferric iron offers certain advantages over the known methods in which peroxides or salts of other metals of variable valencies are used as oxidants. During the synthesis of graft copolymers of cellulose according to the proposed method no homopolymer is formed in the cellulose material, since the oxidation-reduction initiation of graft copolymerization (in contrast to the systems utilizing peroxide-type oxidants) does not involve formation of low-molecular radicals (Diagram 3):

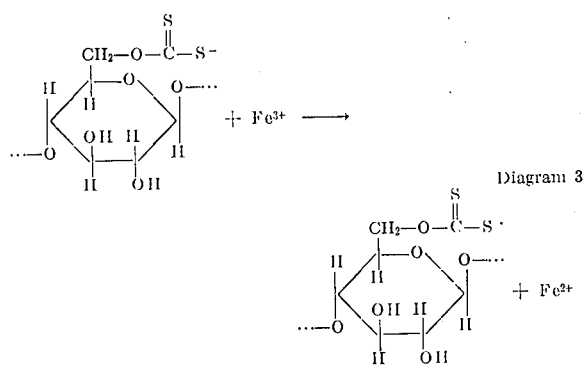

Diagram 3

Moreover, the formation of homopolymer in solution is completely excluded since salts of tervalent iron, having comparatively low oxidation potential are not capable (in contrast to such oxidants as salts of $Ce^{4+}$, $Co^{3+}$, $Mn^{3+}$ and $V^{5+}$) of oxidizing vinyl monomers and of initiating homopolymerization in solution within a practically unlimited course of time.

The proposed method makes it possible to prepare graft copolymers of cellulose with various vinyl monomers, of which most suitable for the purpose are acrylic and methacrylic acids, and also their derivatives, such as esters, amides, and nitriles, as well as styrene or styrene substitute, vinylpyridine and its derivatives, including tertiary and quaternary salts of vinylpyridine derivatives, and also mixtures of the above monomers.

Graft copolymerization of cellulose with salts of tervalent iron proceeds at a high rate and requires the salts in small quanitites. Practically graft copolymerization should be carried out with 2 – 5-fold excess of ferric salts with respect to the stoichiometrically required quantities, which makes it possible to prepare the end product having more uniform distribution of graft polymer. Ferric salts of any mineral and organic acids that are soluble in water can be used for graft copolymerization. The preferable salt is however $Fe_2(SO_4)_3$, since this salt ensures the maximum rate of graft copolymerization.

The starting polymers for the synthesis of graft copolymers of cellulose can be cellulose materials containing dithiocarboxylic or aldehyde groups prepared by preliminary treatment of such materials as wood cellulose, cotton, viscose rayon. Freshly prepared and incompletely reduced xanthogenate fibres can also serve as the starting polymer. The degree of substitution in the starting polymer ($\gamma$-quantity of aldehyde or dithiocarboxylic groups per 100 unit cells of cellulose) should be not higher than 20–25, since otherwise the physical shapes of the starting material will be changed during the process of graft copolymerization. In order to realize graft copolymerization process in accordance with the proposed method, it is recommendable to use cellulose materials having the degree of substitution ($\gamma$) with dithiocarboxylic or aldehyde groups of 5 to 10. Before utilization in the synthesis of graft copolymers, cellulose derivatives should be washed with water to cleanse then from side products that are formed during the production of these derivatives. This decreases the consumption rates of ferric salts.

Graft copolymerization of cellulose is carried out in acid (pH from 1 to 4) aqueous solutions of the monomers or in aqueous emulsions of water-insoluble monomers containing also emulsifying agents of the ionogenic or non-ionogenic type, for example, a mixture of oxyethylated fatty alcohols containing hydrocarbon radicals from $C_{10}$ to $C_{20}$. In order to adjust the pH of the medium to the required value, it is preferred to use mineral acids such as $H_2SO_4$, HCl, $HNO_3$, $H_3PO_4$, etc.

It is recommendable to carry out graft copolymerization in a medium of $H_2SO_4$ at pH 1.4-1.5, since in these conditions the maximum rate of the reaction is attained and the yields of the end product are maximum, too.

Graft copolymerization is carried out at a temperature from 30° to 70°C. The synthesis of graft copolymers can be effected in the presence of inhibitors of radical polymerization of vinyl monomers. This makes it possible to utilize stabilized vinyl monomers without their preliminary purification by distillation, which is another important advantage of the proposed method.

Graft copolymers are synthesized during the time measured from three minutes to two hours, the duration of the synthesis being dependent on the desired degree of grafting (the quantity of the graft polymer).

The proposed method has the following advantages.

The synthesis of graft copolymers of cellulose proceeds without formation of homopolymer in the cellulose material which ensures the higher working properties of the rsultant copolymers and rules out the consumption of the grafted monomer for the formation of the side product, homopolymer.

The high rate of graft copolymerization, commensurable with the rate for viscose rayon formation, and also complete absence of homopolymer formation in solution in the synthesis of graft copolymer during practically unlimited time of contact of graft monomer with ferric salts, make it possible to realize graft copolymerization of cellulose in a continuous process. This simplifies significantly the process equipment used for preparing modified cellulose materials and decreases their cost.

According to the invention, ferric salts should be used as oxidizing agents since they are inexpensive and readily available.

For a better understanding of the invention, the following examples of its practical embodiment are given by way of illustration.

EXAMPLE 1

10 g of an air-dry cellulose sulphate are placed in a vesel, then 250 ml of a 5.5 M aqueous solution of NaOH are added, and the mixture is kept at a temperature of 20°C for 1 hour. The reaction mixture is then passed through a filter with a porous glass element, and the sediment on the filter is dehydrated on rollers until its weight is three times that of the initial cellulose weight. The alkaline cellulose is then ground and placed into a vacuum desiccator over carbon sulphide for twenty minutes. The prepared cellulose dithiocarboxylate is removed from the desiccator and washed with water on a filter until all side products that have been formed during the carbon-sulphide processing are removed. Washed cellulose dithiocarboxylate, having $\gamma10$, with respect to dithiocarboxylic groups, is placed into a thermostatized (50°C) solution containing 20 g of acrylonitrile, 500 ml of water, 10 ml of a 1M solution of $H_2SO_4$ and 0.25 ml of a 1 M solution of $Fe_2(SO_4)_3$. In ten minutes, the reaction product is separated from solution, washed with water and dried at a temperature of 60°C. The weight of the dry product is 18.4 g, which corresponds to a 84 per cent gain in weight of PAN (with respect to the weight of the starting cellulose). Prolonged extraction of the obtained product with dimethylformamide does not decrease the weight of the sample which indicates the absence of PAN homopolymer in the cellulose material. Homopolymer is not formed in the solution.

EXAMPLE 2

10 g of cotton fibre are processed with an 0.1 M aqueous solution of $NaIO_4$, taken in the quantity of 200 ml, at pH 4.5 ($CH_3COONa$ is added) at a temperature of 20°C for one hour. The fibre is then separated, washed with water and then dehydrated until its weight is three times that of the initial sample. The prepared cellulose material containing aldehyde groups ($\gamma 8$) is placed into a solution containing 30 g of methacrylic acid, 500 ml of water, 8 ml of a 1M solution of $H_2SO_4$ and 0.25 ml of a 1 M solution of $Fe_2(SO_4)_3$ and is kept in it at a temperature of 60°C for 15 minutes. Then the reaction product is separated from the solution, rinsed and dried at a temperature of 60°C. The weight of the dry product is 16.5 g, which corresponds to a 65 per cent gain in weight of polymethacrylic acid with respect to the weight of the starting fibre. Prolonged rinsing of the reaction product with an aqueous solution of NaOH (0.5 – 1 per cent) does not decrease the weight of the sample which indicates that homopolymer is absent in the cellulose material. No homopolymer is formed in the solution.

EXAMPLE 3

Fibre is produced from viscose solution (the cellulose content is 6.5 per cent and NaOH 6.7 per cent) by passing it through a draw plate having 200 openings of 0.05 mm at a rate of 30 m per minute (delivery of viscose solution 11.4 g/min) into a precipitating bath containing 8.2 per cent by weight of $H_2SO_4$, 15 per cent by weight of $Na_2SO_4$ and 5 per cent by weight of $ZnSO_4$, at a temperature of 35°C. As fibre emerges from the bath it is placed into a saturated solution of $NaHCO_3$. In 10 minutes, 10 g of freshly prepared fibre containing dithiocarboxylic groups ($\gamma 9$) are obtained. The fibre is rinsed with water and dehydrated until its weight is three times that of the initial. Moist fibre is placed into a thermostatized (70°C) solution containing 30 g of methyl sulphate-N-methyl-2-methyl-5-vinylpyridine, 500 ml of water, 8 ml of a 1M solution of $H_2SO_4$ and 0.25 ml of a 1M solution of $Fe_2(SO_4)_3$ and kept at this temperature for thirty minutes. The fibre is then separated from the solution, washed with water and dried at a temperature of 60°C. The weight of the dry product is 15.2 g which corresponds to a 52 per cent gain in weight of the polymer quaternary salt of methylvinylpyridine. Extraction of the fibre with water does not decrease the weight of the sample, which indicates that no homopolymer is present in the fibre. Identical viscosity of solution before and after graft polymerization indicates the absence of homopolymer formation in the solution.

EXAMPLE 4

Ten grams of viscose rayon (intact) are processed under conditions similar to those described in Example 1. The prepared fibre containing dithiocarboxylic groups ($\gamma 10$) is washed with water and placed into a thermostatized (50°C) emulsion containing 20 g of styrene, 500 ml of water, 0.2 g of an emulsifying agent (a mixture of oxyethylated fatty alcohols having hydrocarbon radicals from $C_{10}$ to $C_{20}$), 10 ml of an 1M solution of $HNO_3$ and 0.2 ml of an 1 M solution of $Fe(NO_3)_3$ and kept at this temperature for 1 hour. After this treatment, the fibre is washed, and dried in a vacuum drier at a temperature of 60°C. The weight of dry product is 14.8 g which corresponds to a 48 per cent gain with respect to the weight of the starting sample. The extraction with benzene does not decrease the weight of the sample, which indicates the absence of formation of homopolymer in the fibre. No homopolymer is produced in the solution.

EXAMPLE 5

The procedure is the same as described in Example 2, except that acrylic acid is used as the grafted vinyl monomer, and the oxidant is ferric chloride added in the quantity of 0.3 ml of an 1 M solution of $FeCl_3$. The product is washed and dried. The yield is 15.3 g which corresponds to a 53 per cent gain with respect to the starting weight of cotton fibre. Homopolymer is not present in the fibre and not formed in the solution.

EXAMPLE 6

10 grams of freshly prepared viscose rayon containing dithiocarboxylic groups ($\gamma 9$) are prepared under conditions similar to those described in Example 3. Fibre washed with water and still containing residual moisture is placed in a thermostatized emulsion (20°C) containing 20 g of acrylonitrile, 3 g of styrene, 500 ml of water, 0.03 g of an emulsifying agent (a mixture of oxyethylated fatty alcohols), 8 ml of an 1 M solution of $H_2SO_4$ and 0.25 ml of an 1 M solution of $Fe_2(SO_4)_3$ and kept at this temperature for 30 minutes. After this treatment fibre is separated from the solution, rinsed with water and dried at a temperature of 60°C. The weight of the dry product is 14.6 g which corresponds to the gain in weight of 46 per cent with respect to the starting weight of the sample. Extraction of the reaction product with trichloroethane does not decrease the weight of the sample, which indicates that no homopolymer is formed in the fibre.

EXAMPLE 7

The procedure is the same as described in Example 2, except that acrylamine is the grafted polymer. The graft copolymerization is carried out for 10 minutes. After rinsing and drying, the weight of the product is 15.0 g, which corresponds to a 50 per cent gain with respect to the weight of the starting sample. Aqueous extraction does not decrease the weight of the sample which indicates that no homopolymer is formed in the fibre. No homopolymer is formed in the solution.

EXAMPLE 8

10 grams of viscose rayon containing dithiocarboxylic groups ($\gamma 9$) is are prepared under conditions similar to those described in Example 3. Fibre rinsed with water is placed in a thermostatized (60°C) emulsion containing 20 g of methacrylic acid, 3 g of methylmethacrylate, 500 ml of water, 0.3 g of an emulsifying agent (a mixture of oxyethylated fatty alcohols), 5 ml of an 1 M solution of $HClO_4$ and 0.6 ml of a 0.5 M solution of $Fe(C_3H_5O_2)_3$, and kept at this temperature for 60 minutes. After this treatment the fibre is rinsed with water and dried at a temperature of 60°C. The weight of dry product is 14.2 g which corresponds to a 42 per cent gain in weight of the starting fibre. The consecutive extraction of the reaction product with trichloroethylene and aqueous solution of NaOH (0.5 – 1 per cent) does not decrease the weight of the sample which indicates that no homopolymer is formed in the fibre. Homopolymer is not formed in the solution.

We claim:

1. A method for preparing graft copolymers of cellulose consisting in that cellulose derivatives containing functional units selected from the group consisting of dithiocarboxylic and aldehyde functional units, are copolymerized with at least one vinyl monomer in an aqueous medium at pH from 1 to 4, the reaction of copolymerization being initiated by oxidizing the said functional units of cellulose with water-soluble salts of tervalent iron; the degree of substitution in the starting cellulose derivative being 5–25 aldehyde or dithiocarboxylic groups per 100 unit cells of cellulose.

2. A method according to claim 1, in which $Fe_2(SO_4)_3$ is used as the water soluble ferric salt.

3. A method according to claim 1, in which ferric salts are taken in quantities two to five times exceeding stoichiometrically required quantities.

4. A method according to claim 1, in which cellulose is copolymerized with vinyl monomers at pH from 1.4 to 1.5.

* * * * *